(12) United States Patent
Riggert et al.

(10) Patent No.: US 11,484,037 B2
(45) Date of Patent: Nov. 1, 2022

(54) TRANSPORT DEVICE FOR TRANSPORTING EVISCERATED POULTRY CARCASSES OR PARTS THEREOF

(71) Applicant: Nordischer Maschinenbau Rud. Baader GmbH + Co. KG, Lübeck (DE)

(72) Inventors: Lasse Riggert, Lübeck (DE); Valentin Fischer, Lübeck (DE)

(73) Assignee: NORDISCHER MASCHINENBAU RUD. BAADER GMBH + CO. KG

(*) Notice: Subject to any disclaimer, the term of this patent is extended or adjusted under 35 U.S.C. 154(b) by 0 days.

(21) Appl. No.: 17/605,131

(22) PCT Filed: Apr. 22, 2020

(86) PCT No.: PCT/EP2020/061205
§ 371 (c)(1),
(2) Date: Oct. 20, 2021

(87) PCT Pub. No.: WO2020/216787
PCT Pub. Date: Oct. 29, 2020

(65) Prior Publication Data
US 2022/0142189 A1    May 12, 2022

(30) Foreign Application Priority Data
Apr. 25, 2019 (EP) ...................... 19171118

(51) Int. Cl.
*A22C 21/06*  (2006.01)
*A22C 21/00*  (2006.01)
*A22B 7/00*   (2006.01)

(52) U.S. Cl.
CPC .......... *A22C 21/0053* (2013.01); *A22B 7/003* (2013.01); *A22C 21/0046* (2013.01)

(58) Field of Classification Search
CPC .. A22B 7/003; A22C 21/0046; A22C 21/0053
(Continued)

(56) References Cited

U.S. PATENT DOCUMENTS 4,780,930 A    11/1988  Sparkia
4,993,114 A *  2/1991  Meyer .................. A22C 21/003
                                                    452/136

(Continued)

FOREIGN PATENT DOCUMENTS

BR    112013004636 A2   7/2016
BR    112014015411 A2   6/2017
(Continued)

OTHER PUBLICATIONS

International Search Report dated Jul. 13, 2020; International Application PCT/EP2020/061205.

*Primary Examiner* — David J Parsley
(74) *Attorney, Agent, or Firm* — Dinsmore & Shohl LLP (57) ABSTRACT

An apparatus for transporting poultry bodies/parts has a transport saddle fastened to a transport unit. A holding apparatus fastens the saddle to the unit, and has a receptacle body for the unit and a fastening body for the saddle. The fastening body is releasably and rotatably connected to the body. The holding apparatus has a latching device to lock the fastening body and saddle, having a latching lever and two latching bolts. The lever on a main body of the receptacle body pivots from a locking position where the lever engaged the bolt into a release position where the lever is out of engagement with the bolt. A first actuating member actuates the lever from the locking into the release position and a second actuating member rotates the fastening body in the release position. First and second magnetic elements with unlike poles pull the lever into the locking position.

13 Claims, 12 Drawing Sheets

(58) Field of Classification Search
USPC .................................. 452/150, 177, 179, 180
See application file for complete search history.

(56) References Cited

U.S. PATENT DOCUMENTS

| | | | |
|---|---|---|---|
| 5,045,022 A * | 9/1991 | Hazenbroek ....... | A22C 21/0069 452/165 |
| 5,273,485 A * | 12/1993 | Hegelmann ........ | A22C 21/0092 452/179 |
| 8,721,404 B2 | 5/2014 | Landt | |
| 9,078,453 B2 * | 7/2015 | Slagboom .......... | A22C 21/0053 |
| 9,775,362 B2 | 10/2017 | Van Mil et al. | |
| 9,795,149 B2 | 10/2017 | Ebbers et al. | |
| 2008/0125025 A1 | 5/2008 | Van Den Nieuwelaar et al. | |
| 2008/0171506 A1 | 7/2008 | Nieuwelaar et al. | |
| 2010/0081366 A1 * | 4/2010 | De Vos .............. | A22C 21/0069 452/172 |
| 2013/0037380 A1 | 2/2013 | Hazenbroek | |
| 2013/0288583 A1 | 10/2013 | Van Hillo et al. | |
| 2021/0030012 A1 | 2/2021 | Riggert et al. | |

FOREIGN PATENT DOCUMENTS

| | | |
|---|---|---|
| CN | 106163288 A | 11/2016 |
| CN | 106163289 A | 11/2016 |
| EP | 0935922 A1 | 8/1999 |
| EP | 3516964 A1 | 7/2019 |
| EP | 3545767 A2 | 10/2019 |
| JP | 2008528026 A | 7/2008 |
| KR | 1020180053324 A | 5/2018 |
| WO | 2015065190 A1 | 5/2015 |
| WO | 2017048118 A1 | 3/2017 |

* cited by examiner

TRANSPORT DEVICE FOR TRANSPORTING EVISCERATED POULTRY CARCASSES OR PARTS THEREOF

CROSS-REFERENCE TO RELATED APPLICATIONS

This application is the U.S. National Stage of PCT/EP2020/061205 filed Apr. 22, 2020, which claims priority to European Patent Application No. 19171118.3, filed Apr. 25, 2019, the content of both are incorporated herein by reference in their entirety.

FIELD OF THE INVENTION

The invention relates to a transport apparatus, configured and adapted for transporting eviscerated poultry bodies or parts thereof in a direction of transport T along a transport path, along which different processing stations can be arranged, comprising a transport unit driven in a continuously revolving manner and at least one transport saddle fastened thereto for holding and positioning the poultry bodies or parts thereof during transport, wherein a holding apparatus is provided for fastening the transport saddle to the transport unit, which holding apparatus consists of a receptacle body associated with the transport unit and a fastening body associated with the transport saddle, which fastening body is releasably connected to the receptacle body and is mounted in the receptacle body so as to be rotatable about an axis of rotation D, wherein the holding apparatus comprises a latching device by means of which the fastening body and thus the transport saddle can be locked in at least two different latching positions, wherein the latching device comprises a latching lever and at least two latching bolts, wherein the latching lever is arranged on a main body of the receptacle body so as to be pivotable about a pivot axis S, which is oriented parallel to the axis of rotation D, and is movable from a locking position, in which the latching lever is in engagement with a latching bolt associated with the fastening body, into a release position, in which the latching lever is out of engagement with a latching bolt of the fastening body, and back, wherein the transport apparatus comprises a first actuating member for actuating the latching lever at least from the locking position into the release position and a second actuating member for rotating the fastening body in the release position of the latching lever.

BACKGROUND OF THE INVENTION

Such transport apparatuses are used in the food-processing industry for bringing products to be processed into engagement with different processing stations along the transport path. During processing, the products must be fixed in a defined position. In principle, each transport saddle is therefore in its locking position. This means that the latching lever is in engagement with the fastening body and thereby prevents the transport saddle from rotating. However, the products located on the transport saddle must in some cases be positioned in different orientations with respect to the processing stations for different processing steps. In order to bring the transport saddle, and thus the products or parts thereof saddled thereon, into a different position, on the one hand the locking must then be released and on the other hand the transport saddle has to be rotated. The actuating members are correspondingly arranged. Through contact of the actuating member for actuating the latching lever with the latching lever, the latching lever is pivoted about the pivot axis S out of engagement with the latching bolt located on the fastening body and into the release position. This release position is maintained until the downstream actuating member for rotating the fastening body is in engagement, or in operative connection, with the fastening body. Through transport of the conveyor unit along the transport path, the fastening body is rotated until the latching lever comes into engagement with the next latching bolt of the fastening body.

Such transport apparatuses are used in particular in semi-automatic or fully automatic breast cap filleting machines in order to bring the poultry carcasses or parts thereof to be processed into the optimal position relative to the processing stations arranged along the transport path. In the solutions known hitherto for releasing and fixing the latching levers, the latching lever of the latching device is spring-actuated. This means that a spring is arranged on the receptacle body, which spring in principle holds the latching lever in the locking position, wherein the spring is substantially relaxed in the locking position. This means that only a small force acts in the locking position. The spring pulls the latching lever, as it were, into the locking position, in which the latching lever is in a latching position with a latching bolt of the fastening body. The movement of the latching lever from the locking position into the release position then takes place against a constantly increasing spring force, when the latching lever, during transport along the transport path, strikes the actuating member for actuating the latching lever, whereby the latching lever pivots out of engagement with the latching bolt. This means that a large spring force acts in the release position. In the release position of the latching lever, the actuating member for rotating the fastening body comes into engagement with the fastening body, so that the fastening body is rotated as transport continues. When rotation of the fastening body is initiated by the actuating member for rotating, the actuating member for actuating the latching lever releases the latching lever again after a predetermined distance, so that the spring pulls the latching lever back in the direction towards the locking position. When the latching lever reaches the next latching position, the latching lever "snaps" into engagement with the next latching bolt for locking.

As mentioned, the highest spring force of the spring of the latching device acts in the release position, while the smallest spring force acts in the locking position. This has the result on the one hand that the locking position of the latching lever is not secure. In other words, the latching lever is held in the locking position only with a small force. On the other hand, the repeated movement of the latching lever from the latching position into the release position has the effect of encouraging wear owing to the force resistances, especially increasing force resistances, acting thereby, so that the working life of the springs is limited. Furthermore, a spring solution, or the associated spring, requires increased installation space and is difficult to clean owing to the uneven surface structure.

Accordingly, the object underlying the invention is to propose a transport apparatus having a latching device which is compact and easy to clean, which transport apparatus ensures reliable and low-wear positioning of the transport saddles and locking thereof in the locking position.

SUMMARY OF THE INVENTION

This object is achieved by a transport apparatus of the type mentioned hereinbefore in that the latching device comprises at least two magnetic elements, wherein a first magnetic element is associated with the receptacle body and a second magnetic element is associated with the latching lever, such that unlike poles of the first magnetic element and of the second magnetic element are located opposite one another so as to attract one another and pull the latching lever into the locking position. By replacing the spring solution with a magnet solution, a latching device of the transport apparatus that is durable and easy to clean is provided in a simple manner. Of particular advantage, however, is the technical effect that the greatest (holding) force of the latching device exists in the locking position, which leads to particularly secure and precise positioning of the transport saddles, and a smaller and especially decreasing force exists in the release position, so that the mechanical loading of the latching device is lower.

A particularly preferred further development is characterised in that the latching device comprises a third magnetic element which is associated with the receptacle body and is positioned on the side of the latching lever opposite the first magnetic element, such that like poles of the second magnetic element and of the third magnetic element are located opposite one another so as to repel one another and push the latching lever into the locking position. The first and second magnetic elements ensure that the latching lever is held securely in the locking position. The third magnetic element ensures that the latching lever is pushed reliably and quickly out of the release position back into the locking position. The reliable functionality of the latching device is thereby optimised.

In an advantageous embodiment, the main body of the receptacle body has a depression at its trailing end in the direction of transport T on the side facing the fastening body, into which depression the latching lever with a protrusion dips at least in part, wherein the first magnetic element is positioned in the depression of the main body in the region of a rear wall and the second magnetic element is positioned in the protrusion of the latching lever. With this space-saving arrangement of the magnetic elements, a particularly reliable and compact latching device is provided.

The third magnetic element is advantageously positioned in the depression of the main body in the region of a side wall, such that the latching lever is arranged with its protrusion, in which the second magnetic element is located, between the first and the third magnetic element in the manner of a sandwich. By the serial arrangement (in the direction of transport T) of the magnetic elements, it is ensured on the one hand that the latching lever is pulled for secure locking and on the other hand that the latching lever is reliably pushed from the release position back into the locking position. Furthermore, this arrangement permits a configuration of the latching device which is space-saving and thus reduces installation space.

An expedient further development is characterised in that the main body has an opening in the region of the depression, the main orientation of which opening is oriented parallel to the pivot axis S and the axis of rotation D, such that the protrusion of the latching lever dips with its free end at least in part into this opening, such that a side wall of the opening, in addition to the latching bolt, is configured as an abutment for the latching lever in its locking position. In other words, the main body has, transversely to the direction of transport T, an opening which is delimited circumferentially by side walls, wherein one side wall, namely the side wall that is trailing in the direction of transport T, forms an abutment or contact surface for the protrusion of the latching lever. The stability of the latching device is thereby increased.

Particularly preferably, there is associated with the fastening body a rotating body in the form of a Maltese cross, which has on the one hand four recesses arranged offset relative to one another by 90° in the region of the circumference for the engagement of the actuating member for rotating the fastening body, and on the other hand, on the side facing the receptacle body, at least four latching bolts arranged offset relative to one another by 90°, which latching bolts can be brought into operative connection with the latching lever. With this configuration, the rotation of the fastening body in 90° steps to form four latching positions is ensured in a simple and secure manner.

The latching lever advantageously has on its inner side facing the axis of rotation D a recess for receiving a latching bolt. The inner side has a generally arcuate profile, wherein the arcuate profile is interrupted by the recess. The size of the recess is adapted to the latching bolts. In the locked state, the latching bolt is located in the recess, so that rotation of the fastening body is prevented. As soon as the latching lever is out of engagement with the latching bolt, the fastening body can be rotated, wherein during the rotation a following latching bolt slides on the arcuate inner side of the latching lever until the latching bolt "snaps" into the recess again. Particularly simple and nevertheless particularly secure rotation and locking are thereby ensured.

The transport unit preferably comprises a transport chain, and at least one guide rail is arranged along the transport chain at least in some regions, on which guide rail the receptacle body of the holding apparatus is guided with a groove formed in the main body. Quiet running of the transport chain and precise positioning of the transport saddles are thereby ensured.

In a particularly advantageous further development, two guide rails arranged spaced apart from one another are arranged along the transport chain at least in some regions, between which guide rails the main body is guided with corresponding grooves, wherein the actuating member for actuating the latching lever is arranged on one guide rail and the actuating member for rotating the fastening body is arranged on the other guide rail. Because the main body is guided on two opposite sides, the above-mentioned advantages are enhanced further. The arrangement of the actuating members can, however, also vary.

The actuating member for rotating the fastening body is expediently arranged behind the actuating member for actuating the latching lever in the direction of transport T of the transport unit. A particularly simple construction of the transport apparatus is thereby ensured.

An advantageous embodiment is characterised in that the latching lever projects with an actuating lug beyond the main body of the receptacle body, such that the actuating member for actuating the latching lever enters into operative connection with the actuating lug of the latching lever as the transport saddle passes. With this configuration, particularly simple and reliable actuation of the latching device is provided.

At least some of the magnetic elements are advantageously in the form of bar magnets, wherein the bar magnets are oriented with their longitudinal axis in the direction of transport T. In this manner, a space-saving arrangement of the magnetic elements is ensured, in which unlike poles face one another between the first and the second magnetic element, while like poles face one another between the second and the third magnetic element.

In a preferred embodiment, at least some of the bar magnets are arranged in blind holes, wherein the open sides of the blind holes are closed by means of a cover, such that the bar magnets inside the blind holes are completely shielded relative to the surroundings. Because the bar magnets are arranged in closed pockets, the bar magnets are protected from contamination, and smooth surfaces, which are particularly easy to clean, are formed.

BRIEF DESCRIPTION OF THE DRAWINGS

Further expedient and/or advantageous features and further developments of the transport apparatus will become apparent from the dependent claims and the description. Particularly preferred embodiments of the transport apparatus will be explained in greater detail with reference to the accompanying drawing, in which:

DETAILED DESCRIPTION OF THE INVENTION

The transport apparatus, only part of which is shown in the drawing, serves to transport and position eviscerated poultry bodies or parts thereof, such as, for example, breast caps or front halves. The transport apparatus can also be used in a corresponding manner for other products which are to be able to be positioned in different positions along the transport path.

The transport apparatus 10 shown is configured and adapted for transporting eviscerated poultry bodies or parts thereof in a direction of transport T along a transport path. Different processing stations which require different positioning of the poultry bodies or parts thereof can be arranged along the transport path. The transport apparatus 10 comprises a transport unit 11 driven in a continuously revolving manner and at least one transport saddle 12 fastened thereto for holding and positioning the poultry bodies or parts thereof during transport, wherein a holding apparatus 13 is provided for fastening the transport saddle 12 to the transport unit 11, which holding apparatus consists of a receptacle body 14 associated with the transport unit 11 and a fastening body 15 associated with the transport saddle 12, which fastening body is releasably connected to the receptacle body 14 and is mounted in the receptacle body 14 so as to be rotatable about an axis of rotation D, wherein the holding apparatus 13 comprises a latching device 16 by means of which the fastening body 15 and thus the transport saddle 12 can be locked in at least two different latching positions, wherein the latching device 16 comprises a latching lever 17 and at least two latching bolts 18, wherein the latching lever 17 is arranged on a main body 19 of the receptacle body 14 so as to be pivotable about a pivot axis S, which is oriented parallel to the axis of rotation D, and is movable from a locking position, in which the latching lever 17 is in engagement with a latching bolt 18 associated with the fastening body 15, into a release position, in which the latching lever 17 is out of engagement with a latching bolt 18 of the fastening body 15, and back, wherein the transport apparatus 10 comprises a first actuating member 20 for actuating the latching lever 17 at least from the locking position into the release position and a second actuating member 21 for rotating the fastening body 15 in the release position of the latching lever 17.

This transport apparatus 10 is distinguished according to the invention in that the latching device 16 comprises at least two magnetic elements 22, 23, wherein a first magnetic element 22 is associated with the receptacle body 14 and a second magnetic element 23 is associated with the latching lever 17, such that unlike poles of the first magnetic element 22 and of the second magnetic element 23 are located opposite one another so as to attract one another and pull the latching lever 17 into the locking position.

The features and further developments described hereinbelow represent preferred embodiments when considered on their own or in combination with one another. It is expressly pointed out that features that are summarised in the claims and/or the description and/or the drawing or described in a common embodiment can also develop further the transport apparatus 10 described above functionally independently.

The transport unit 11 driven in a revolving manner is guided around deflection and/or drive elements which are not shown explicitly. The axes of rotation of the deflection and/or rotating elements can be oriented horizontally, for example to form an upper run and a lower run. The axes of rotation can, however, also have any other orientation, for example 45° to the horizontal orientation. A plurality of transport saddles are preferably arranged on the transport unit. The transport path extends over the entire revolving length of the transport unit 11. The transport unit 11 can be driven intermittently or continuously by means of a drive means. The drive means is preferably connected to a control device. The holding apparatuses 13, and more precisely the receptacle bodies 14, comprise fastening means 52 with which the connection to the transport unit 11 is established.

Each transport saddle 12 can be in one-part or multi-part form. The transport saddle 12 comprises the fastening body 15 and a supporting body 24, which is preferably releasably connected to the fastening body 15. The fastening body 15 can likewise be in one-part or multi-part form. The fastening body 15 preferably comprises a rotating body 25 consisting of plastics material and a clamping body 26 consisting of metal, for example stainless steel.

The latching device 16 preferably comprises a third magnetic element 27 which is associated with the receptacle body 14 and is positioned on the side of the latching lever 17 opposite the first magnetic element 22, such that like poles of the second magnetic element 23 and of the third magnetic element 27 are located opposite one another so as to repel one another and push the latching lever 17 into the locking position. For example, the north pole of the first magnetic element 22 and the south pole of the second magnetic element 23 are located opposite one another directly or slightly spaced apart from one another, while the north pole of the second magnetic element 23 and the north pole of the third magnetic element 27 are located opposite one another directly or slightly spaced apart.

The main body 19 of the receptacle body 14 has a depression 28 at its trailing end E in the direction of transport T on the side facing the fastening body 15 (see in particular FIG. 5), into which depression the latching lever 17 with a protrusion 29 dips at least in part, wherein the first magnetic element 22 is positioned in the depression 28 of the main body 19 in the region of a rear wall 30 and the second magnetic element 23 is positioned in the protrusion 29 of the latching lever 17. Of course, other constructions and arrangements of the latching lever 17 relative to the main body 19 are also possible. The depression 28, which in the embodiment shown is configured to run from the trailing end E without a side wall, can, for example, also be surrounded circumferentially by side walls, wherein the first magnetic means 22 can then be arranged, for example, in a side wall of the trailing end E. The depression 28 can also be formed at the leading end.

The third magnetic element 27 is positioned in the depression 28 of the main body 19 in the region of a side wall 51, such that the latching lever 17 is arranged with its protrusion 29, in which the second magnetic element 23 is located, between the first and the third magnetic element 22, 27 in the manner of a sandwich. The magnetic elements 22, 23, 27 can be mounted on the main body 19 or the latching lever 17. Preferably at least the third magnetic element is set into the main body 19.

In an embodiment which is not shown, the rear wall 33 of the main body 19, and thus also the rear wall 30 of the depression 28, is configured so as to be completely closed. In the variant shown, the main body 19 has an opening 31 in the region of the depression 28, the main orientation of which opening is oriented parallel to the pivot axis S and the axis of rotation D, such that the protrusion 29 of the latching lever 17 dips with its free end at least in part into this opening 31, such that a side wall 32 of the opening 31, in addition to the latching bolt 18, is configured as an abutment for the latching lever 17 in its locking position. The opening 31 is configured to be spaced apart from the trailing end E so that a connecting web 34 is formed, at or on which the first magnetic element 22 is arranged.

Figure 12:
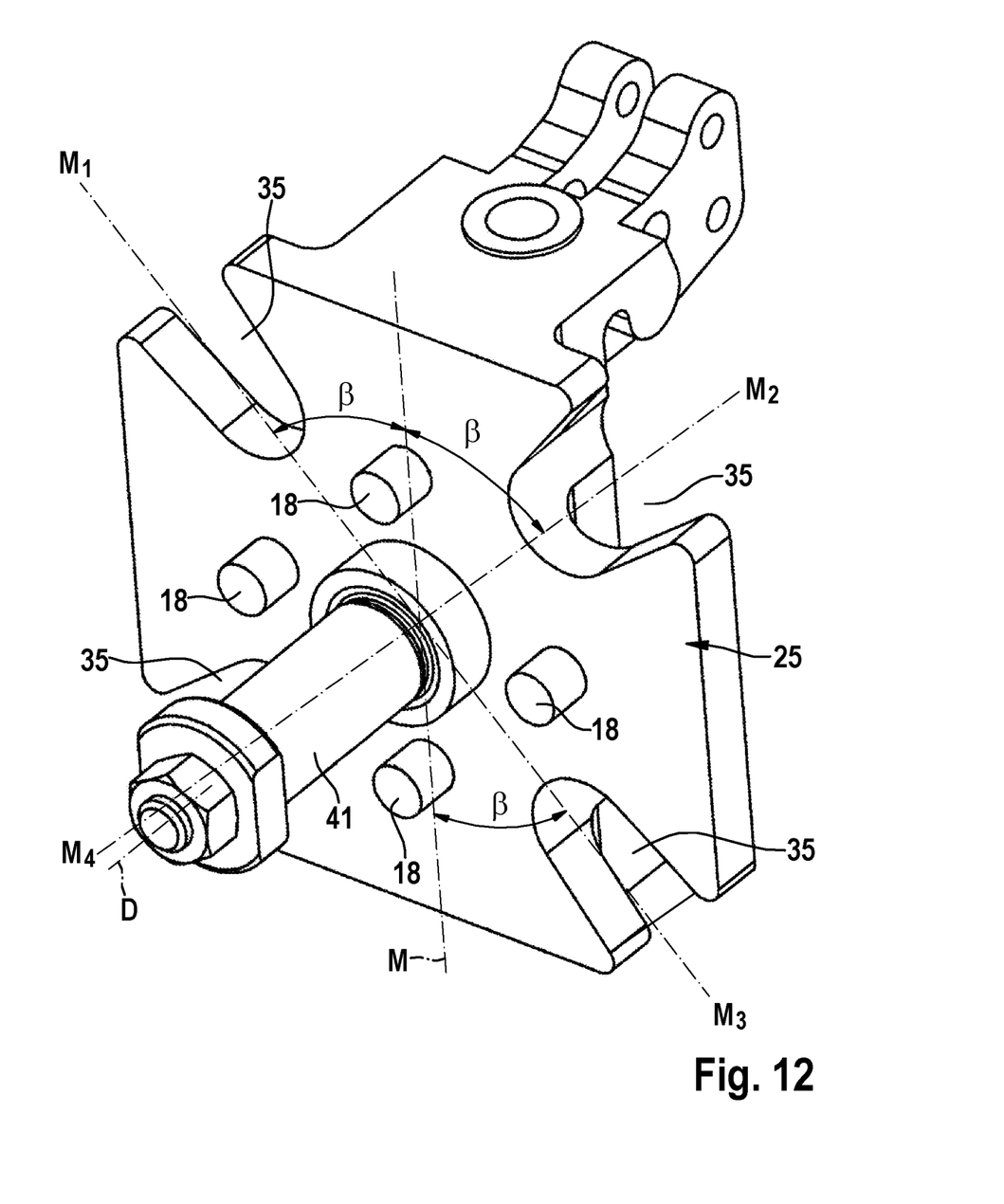
FIG. 12 shows the rotating body according to FIG. 11 from behind.

Associated with the fastening body 15 is the rotating body 25 in the form of a Maltese cross, which has on the one hand four recesses 35 arranged offset relative to one another by 90° in the region of the circumference for the engagement of the actuating member 21 for rotating the fastening body 15, and on the other hand, on the side facing the receptacle body 14, at least four latching bolts 18 arranged offset relative to one another by 90°, which latching bolts can be brought into operative connection with the latching lever 17 (see in particular FIG. 12). The rotating body 25 of preferably quadratic form, which can also be referred to as a rotating cross, has, distributed uniformly over the circumference, a recess 35 in each of the corner regions. The central axes $M_1$, $M_2$, $M_3$ and $M_4$ of the recesses 35 are each oriented at an angle $\beta$ of approximately 45° to the central axis M of the rotating body 25, and for this reason the rotating body 25 has the form of the Maltese cross. Other forms and structural configurations of the rotating body 25 can likewise be used. The rotating body 25 can be configured structurally differently, for example as a rotating plate, and especially have fewer than four and more than four recesses 35 and fewer than four and more than four latching bolts 18. In the preferred embodiment shown, the grid/pattern of the four recesses 35 is arranged about the axis of rotation D offset by 45° relative to the grid/pattern of the four latching bolts. Instead of the recesses 35 that are open to the outside, elongated holes or the like can also be provided. The latching bolts 18 can also be replaced by latching lugs, latching hooks or other latching elements. The fastening body 15 has a shaft 41 which is configured for mounting in a bearing bush 42 of the main body 19.

Figure 5:
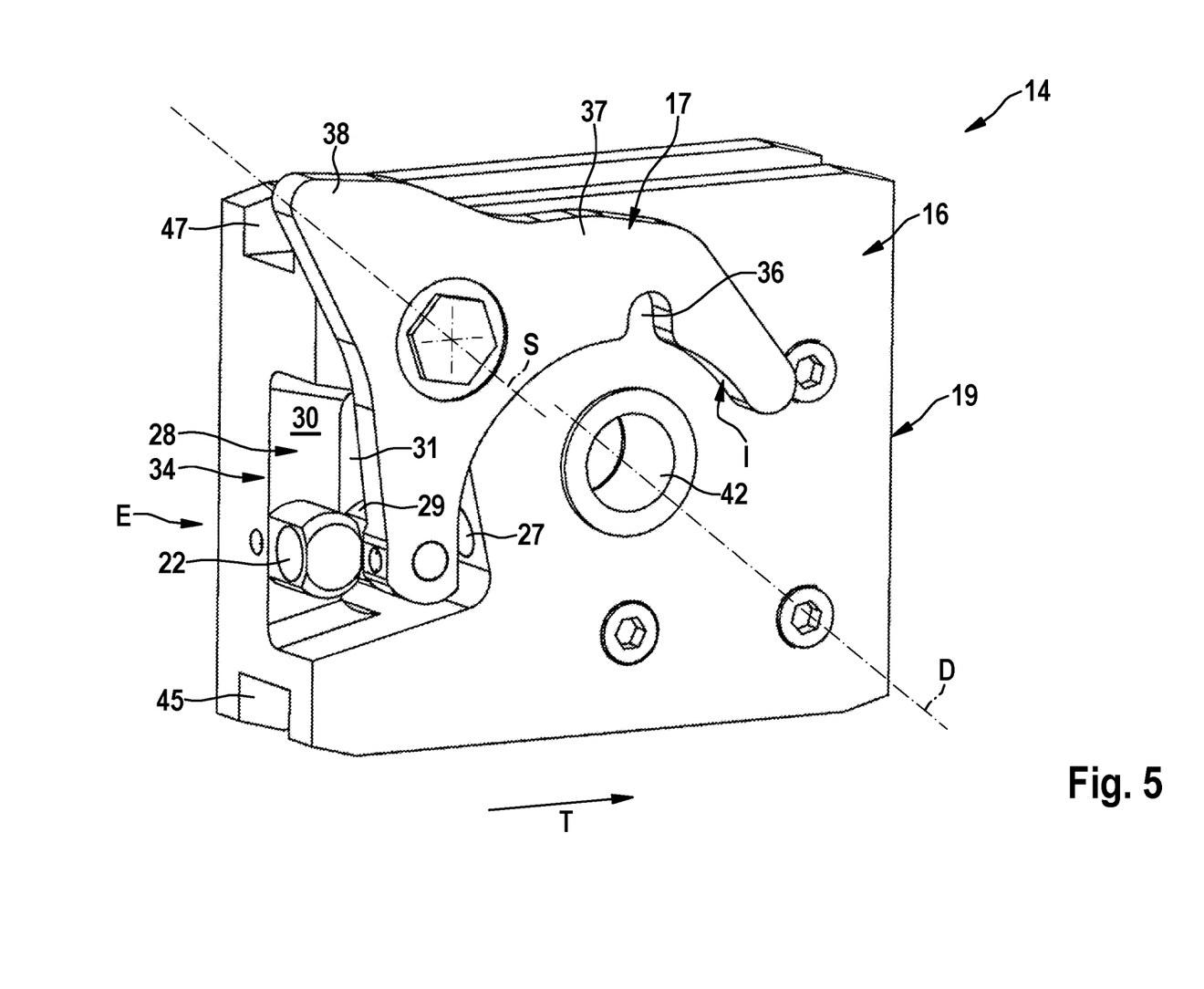
FIG. 5 shows the main body according to FIG. 4 from the front.
Figure 6:
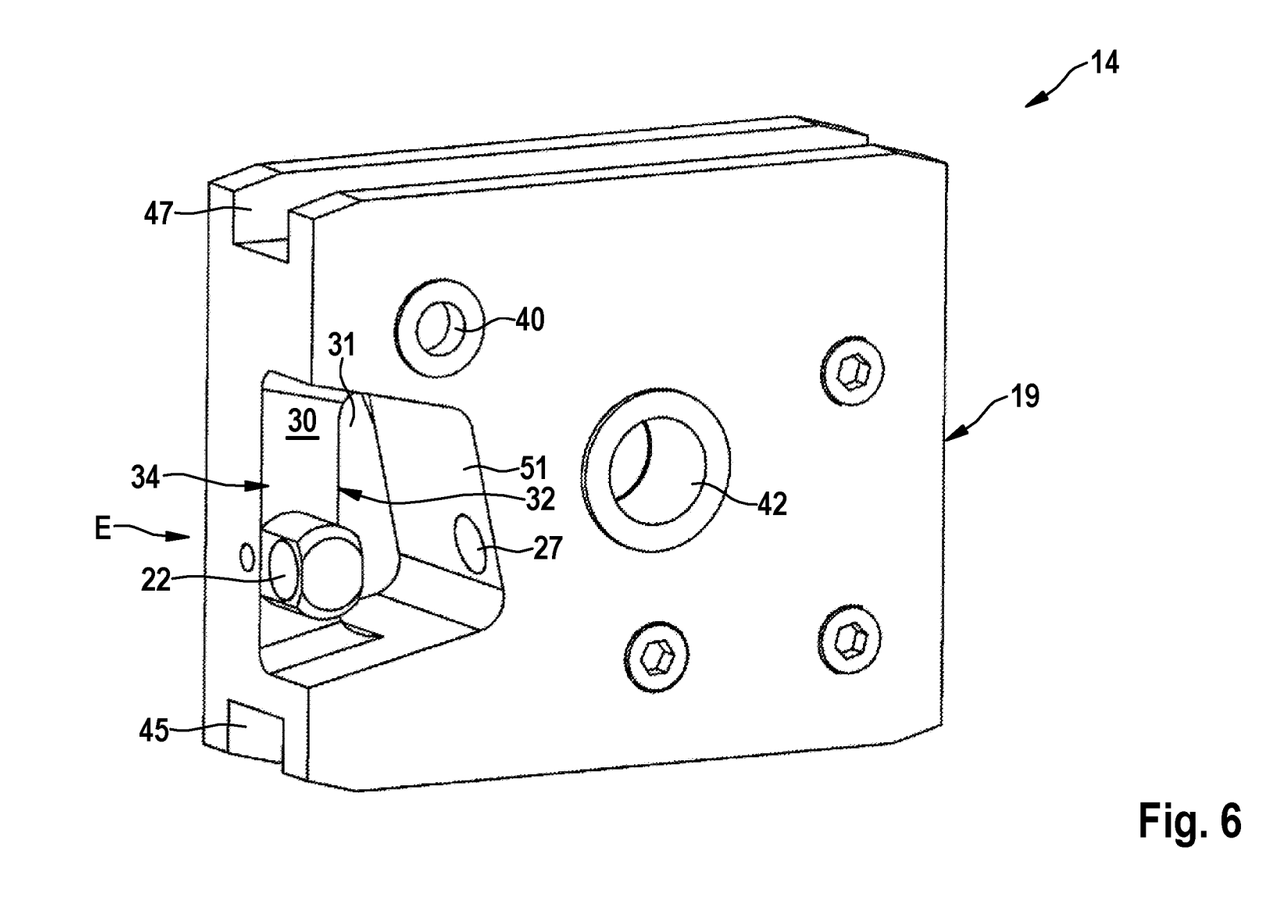
FIG. 6 shows the main body according to FIG. 5 without a latching lever.
Figure 7:
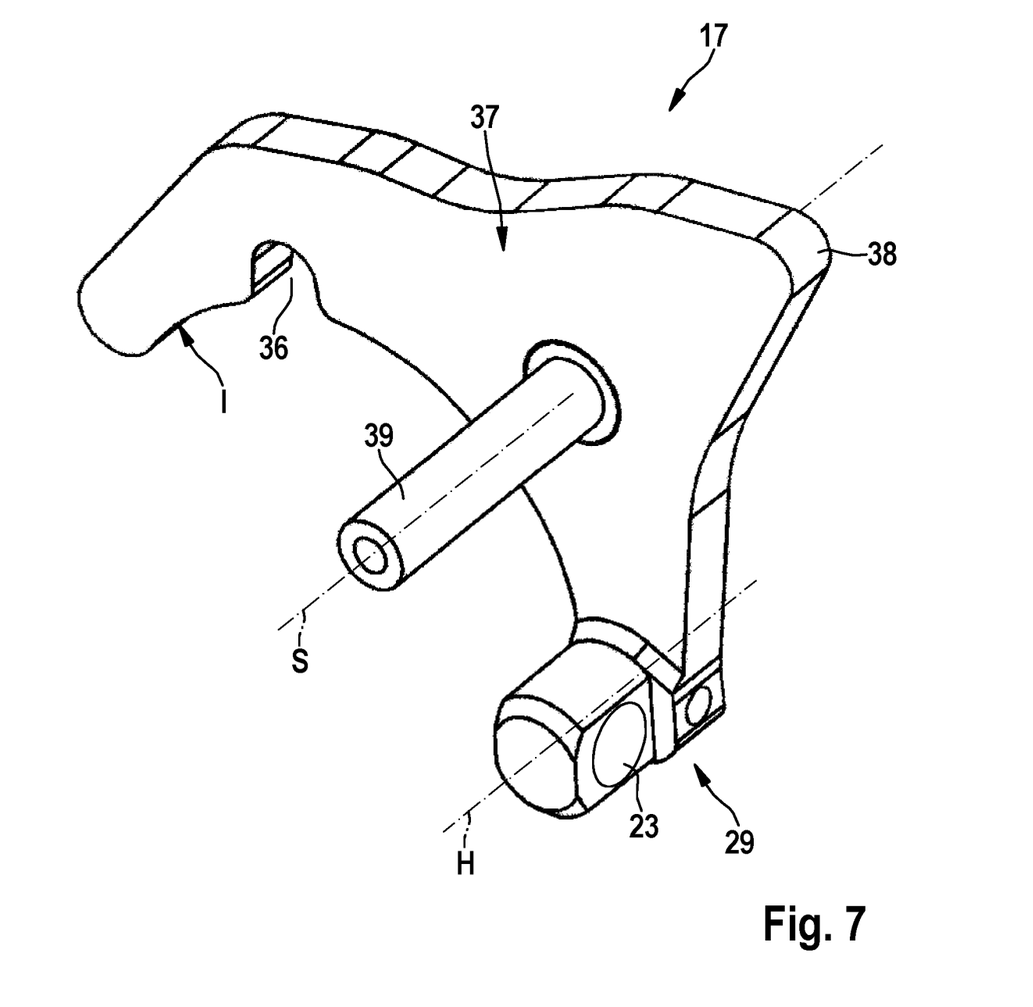
FIG. 7 shows the latching lever from behind.
Figure 8:
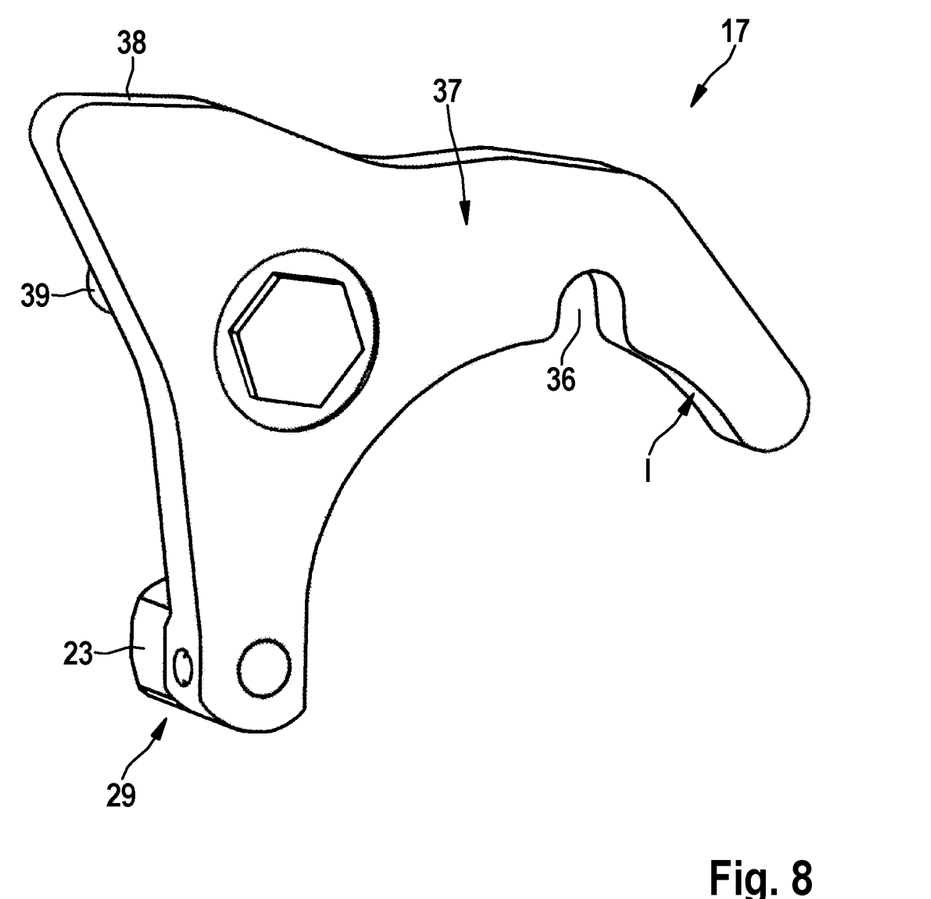
FIG. 8 shows the latching lever from the front.
Figure 9:
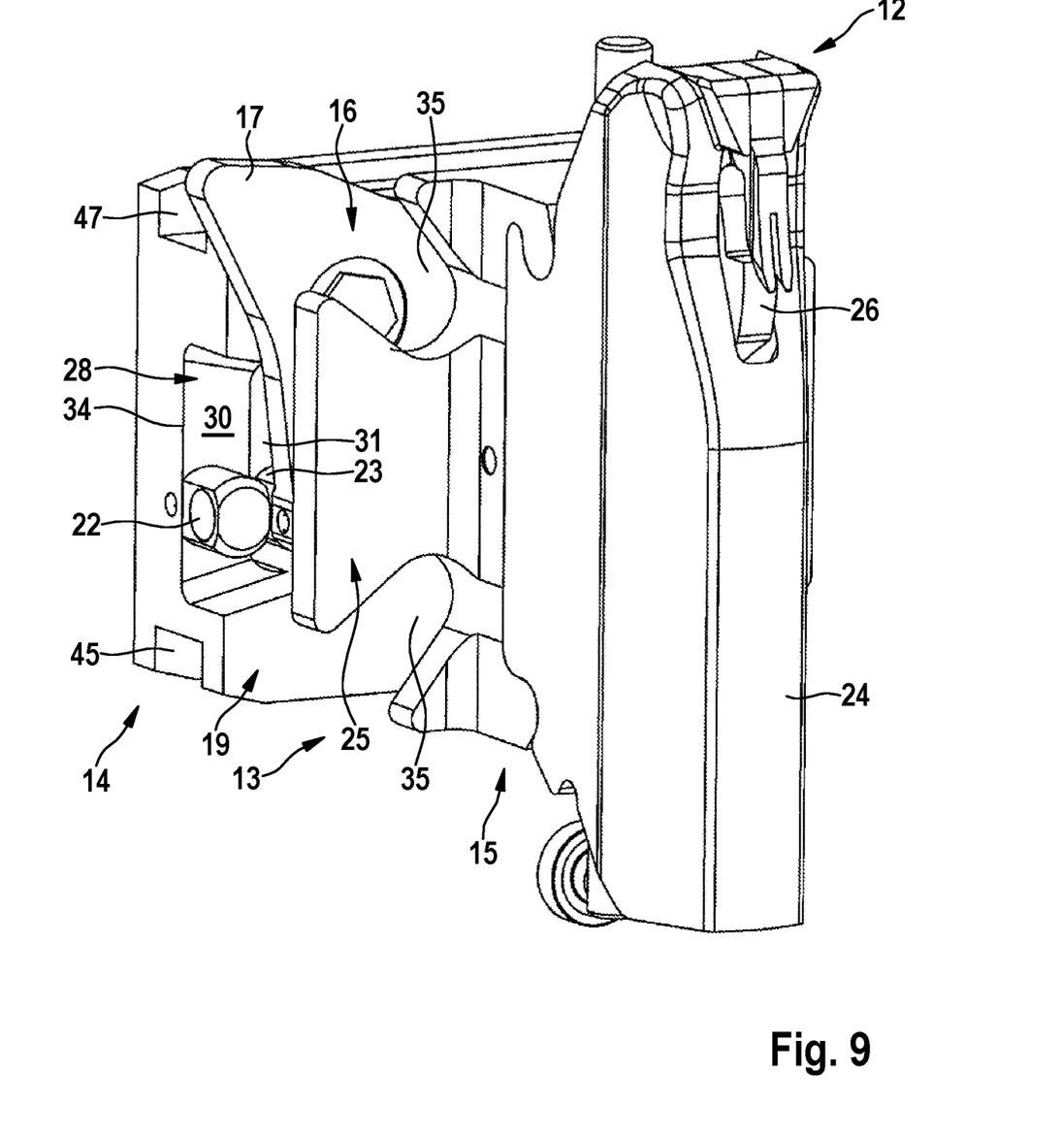
FIG. 9 shows the complete transport saddle obliquely from the front.
Figure 10:
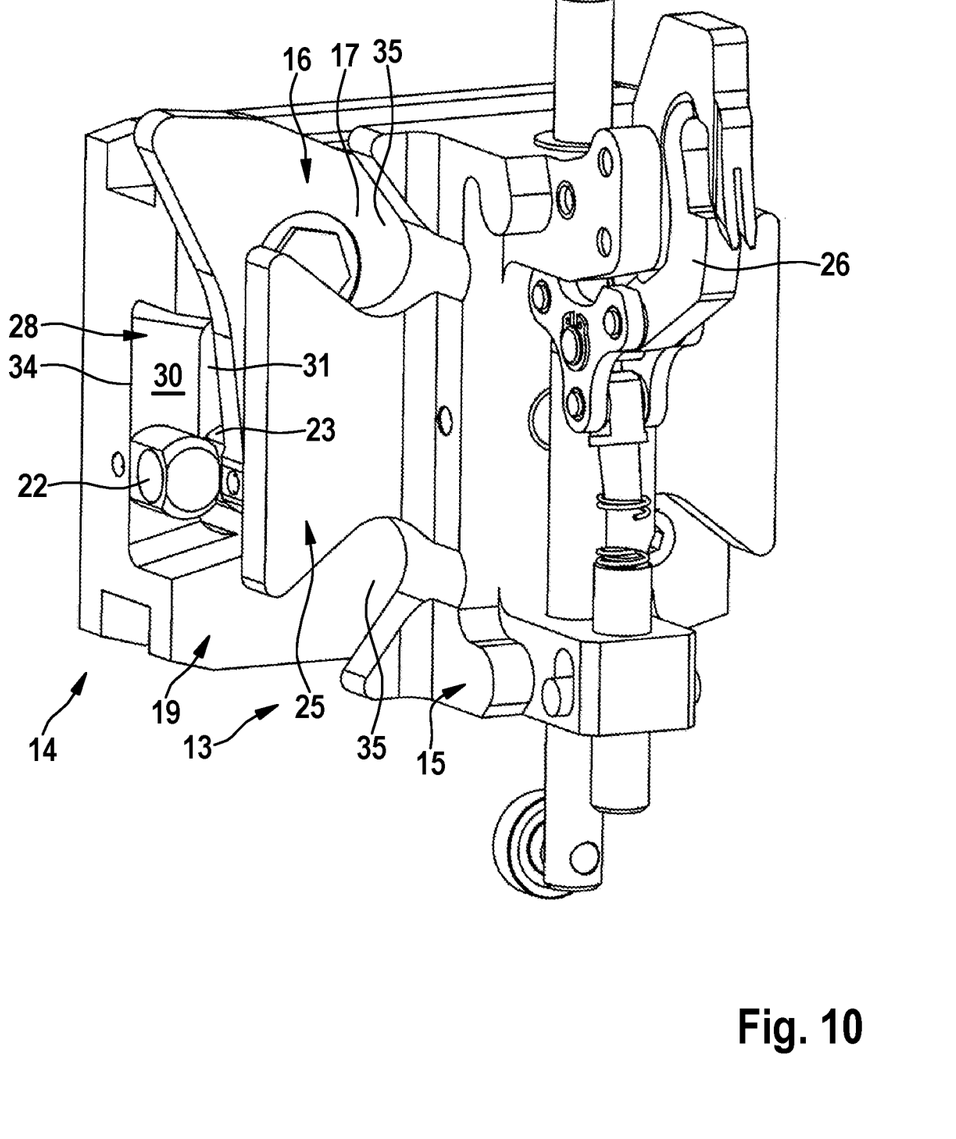
FIG. 10 shows the illustration according to FIG. 9 without a supporting body of the transport saddle.
Figure 11:
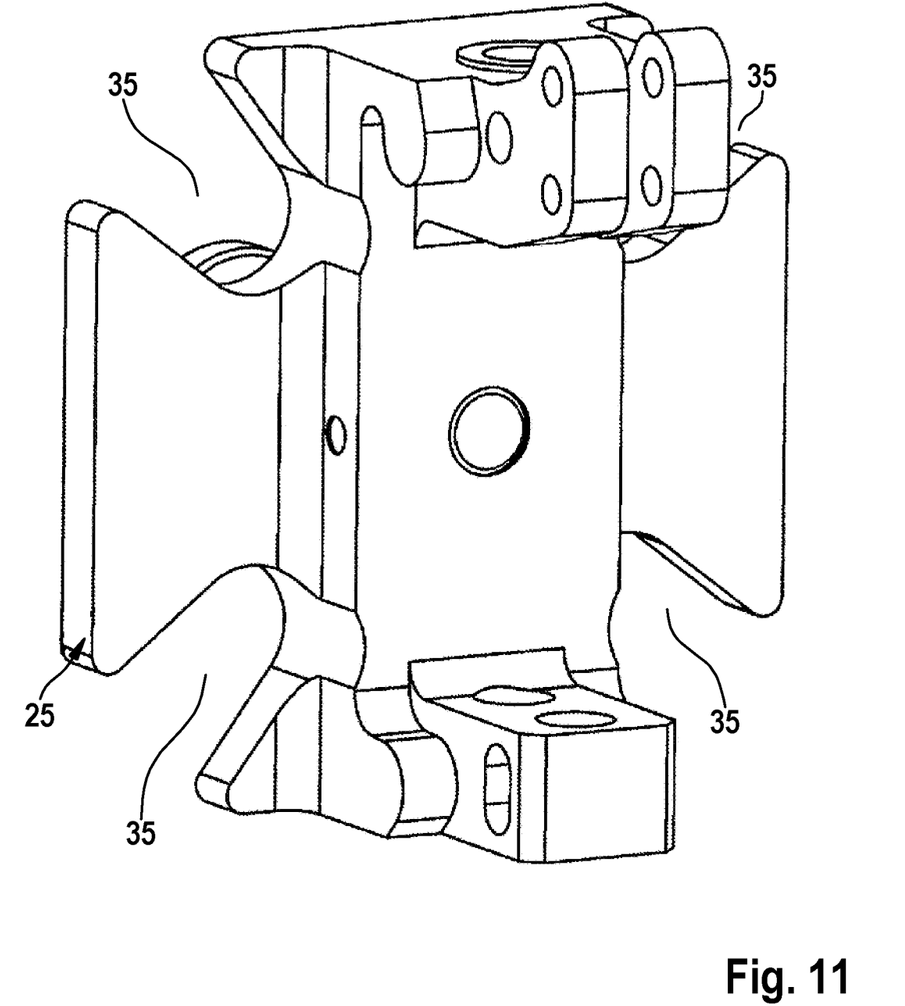
FIG. 11 shows the rotating member as part of the fastening body obliquely from the front.

The preferred form of the latching lever 17 can be seen in particular in FIGS. 5, 7 and 8. The latching lever 17 has on its inner side I facing the axis of rotation D a recess 36 for receiving a latching bolt 18. The inner side I has an arcuate profile. The arcuate profile is interrupted by the recess 36. It is also possible that more than one recess 36 is formed along the arcuate inner side I. The latching lever 17, which is preferably in one piece, comprises, in addition to a hook-shaped lever body 37, the protrusion 29 and an actuating lug 38, which is configured and adapted to lie against and/or contact the actuating member 20 for pivoting the latching lever 17. As mentioned, the second magnetic element 23 is arranged at or in the protrusion 29. The magnetic element 23 itself can be arranged or fastened directly on or to the lever body 37 and thus form the protrusion 29. The main axis H of the protrusion 29 extends parallel to the pivot axis S. For pivoting the latching lever 17 about the pivot axis S, a shaft 39 (see e.g. FIG. 7) is formed or arranged on the latching lever 17, which shaft is configured for mounting in a bearing bush 40 of the main body 19.

The transport unit 11 preferably comprises a transport chain 43. At least one guide rail 44 is arranged along the transport chain 43 at least in some regions, on which guide rail the receptacle body 14 of the holding apparatus 13 is guided with a groove 45 formed in the main body 19. Particularly preferably, two guide rails 44, 46 arranged spaced apart from one another are arranged along the transport chain 43 at least in some regions, between which guide rails the main body 19 is guided with corresponding grooves 45, 47. In the embodiment shown, the actuating member 20 for actuating the latching lever 17 is arranged on one guide rail 46 and the actuating member 21 for rotating the fastening body 15 is arranged on the other guide rail 44. A reverse arrangement is, however, also possible. The actuating members 20, 21 can also be arranged on a common guide rail 44 or 46. Optionally, the actuating members 20, 21 can also be arranged separately from the guide rails 44, 46.

The actuating member 21 for rotating the fastening body 15 is preferably arranged behind the actuating member 20 for actuating the latching lever 17 in the direction of transport T of the transport unit. "Behind" thereby refers not to the structural attachment but to the position in which the actuating members 20, 21 come into engagement with the latching lever 17 or the fastening body 15. The actuating member 20 for pivoting the latching lever 17 can be a simple bolt, abutment or the like which is stationarily arranged on the guide rail 46 and lies in the transport path of the actuating lug 38 of the latching lever 17, such that the latching lever 17 is pivoted out of engagement with the latching bolt 18 through transport along the transport path on passing the actuating member 20. In a particularly preferred embodiment, the latching lever 17 projects with the actuating lug 38 beyond the main body 19 of the receptacle body 14, such that the actuating member 20 for actuating the latching lever 17 comes into operative connection with the actuating lug 38 of the latching lever 17 as the transport saddle 12 passes. The actuating member 20 can also be a freely rotatable roller 48 or the like. In other embodiments, in which the latching lever 17 is to be/must be held in the release position over a longer distance, for example in order to rotate the fastening body 15 by means of the rotating body 25 through a larger angular amount, the actuating member 20 can, for example, also be a rail or the like extending in the direction of transport T. The actuating member 20 can also be adjustably arranged on the guide rail 46.

The actuating member 21 for rotating the fastening body 15 can be a simple angle element 49 or the like, wherein an arm 50 of the angle element 49 projects into the transport path of the rotating body 25, such that the rotating body 25, as the transport saddle 12 passes, comes into engagement with the arm 50 with a recess 35. Further transport in the direction of transport T then leads to rotation of the fastening body 15, through 90° in the exemplary embodiment shown. Two or more such actuating members 21 can also be arranged one behind the other in the direction of transport T in order to come into engagement with the next recess 35 of the rotating body 25.

At least some of the magnetic elements 22, 23, 27 are in the form of bar magnets, wherein the bar magnets are oriented with their longitudinal axis in the direction of transport T. The bar magnets 22, 23, 27 are preferably oriented with their longitudinal axes substantially in alignment with one another. In the embodiment shown, at least the first and the third magnetic element 22, 27 are in the form of a bar magnet. The second magnetic element 23 is preferably also in the form of a bar magnet. At least some of the bar magnets are arranged in blind holes, wherein the open sides of the blind holes are optionally closed by means of a cover, such that the bar magnets inside the blind holes are completely shielded relative to the surroundings. The magnetic elements 22, 23, 27 each comprise permanent magnets and/or electromagnets. The permanent magnets are particularly preferably in the form of neodymium magnets. Yet more preferably, they are nickel-plated neodymium magnets.

Figure 1:
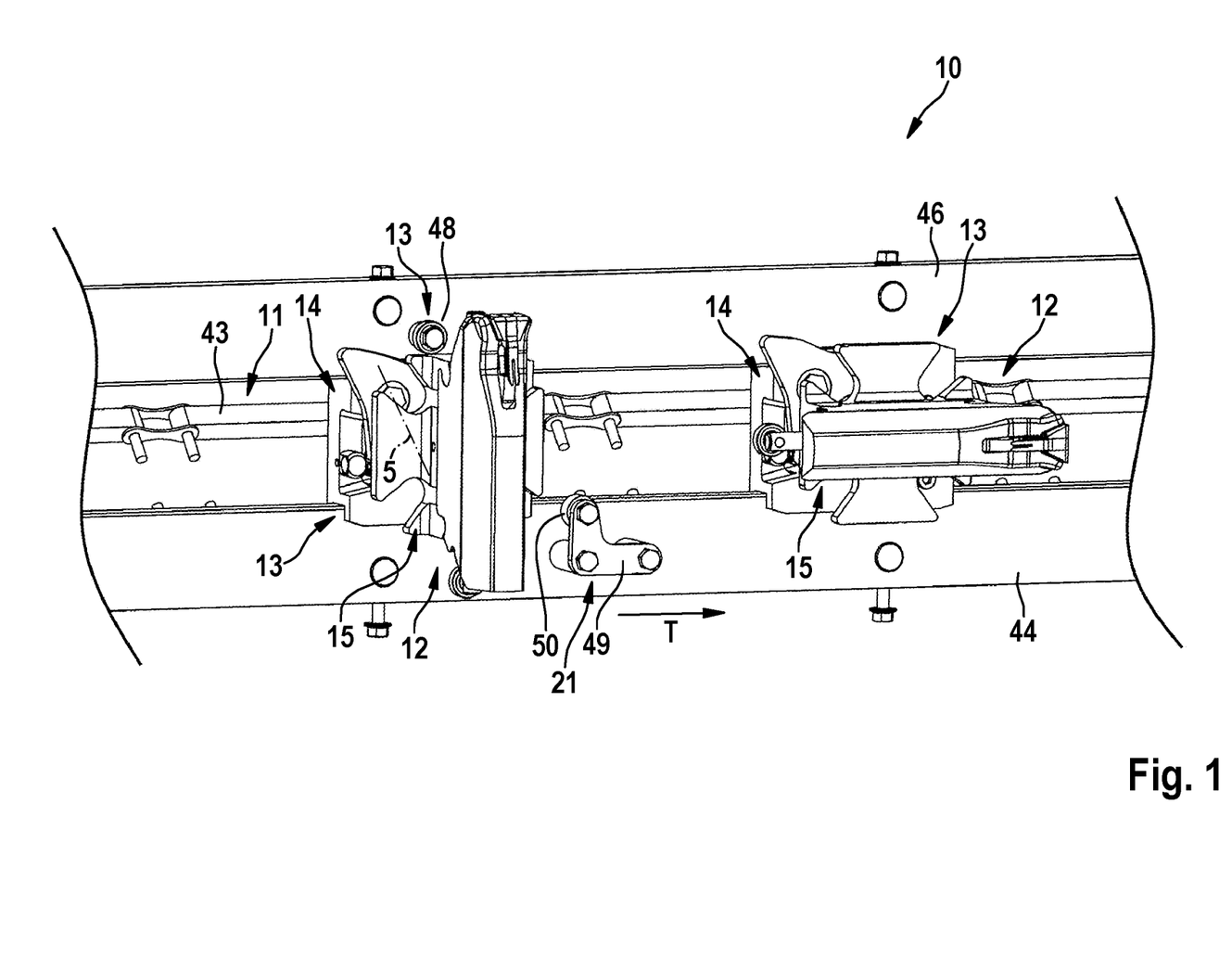
FIG. 1 shows part of a transport apparatus with two transport saddles in different positions in a front view.
Figure 2:
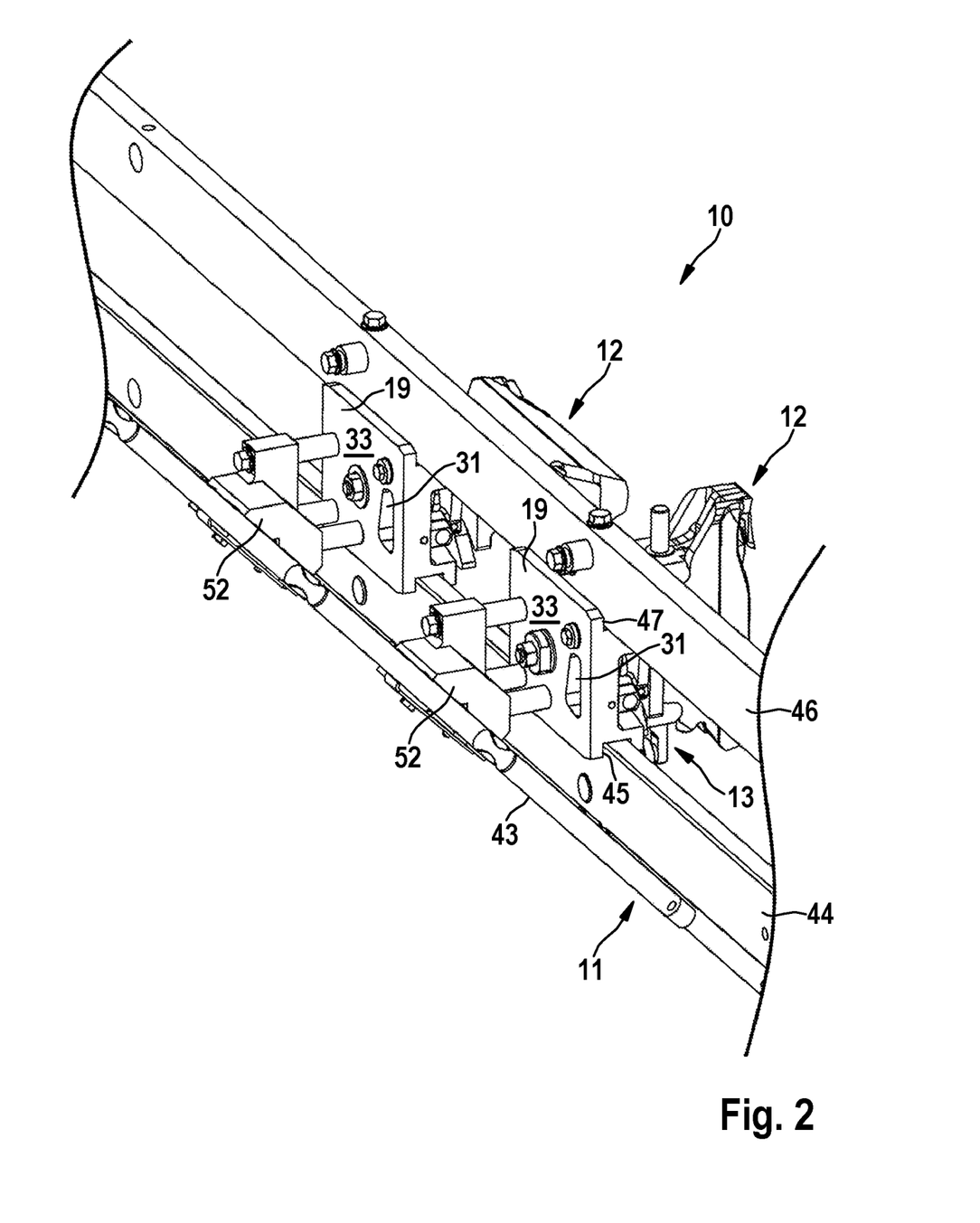
FIG. 2 shows the part according to FIG. 1 in a rear view.
Figure 3:
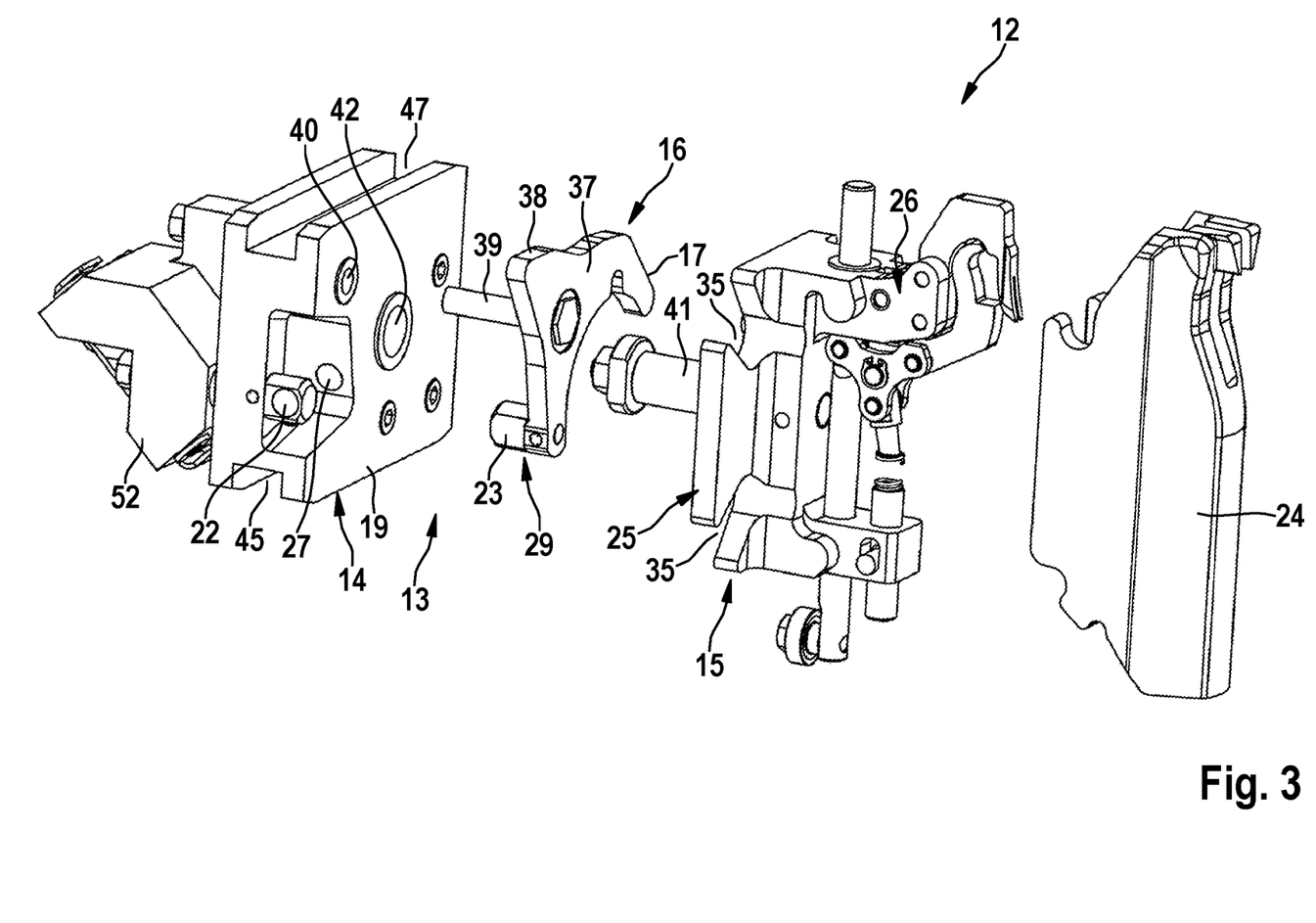
FIG. 3 is an exploded view of a transport saddle with a holding apparatus.
Figure 4:
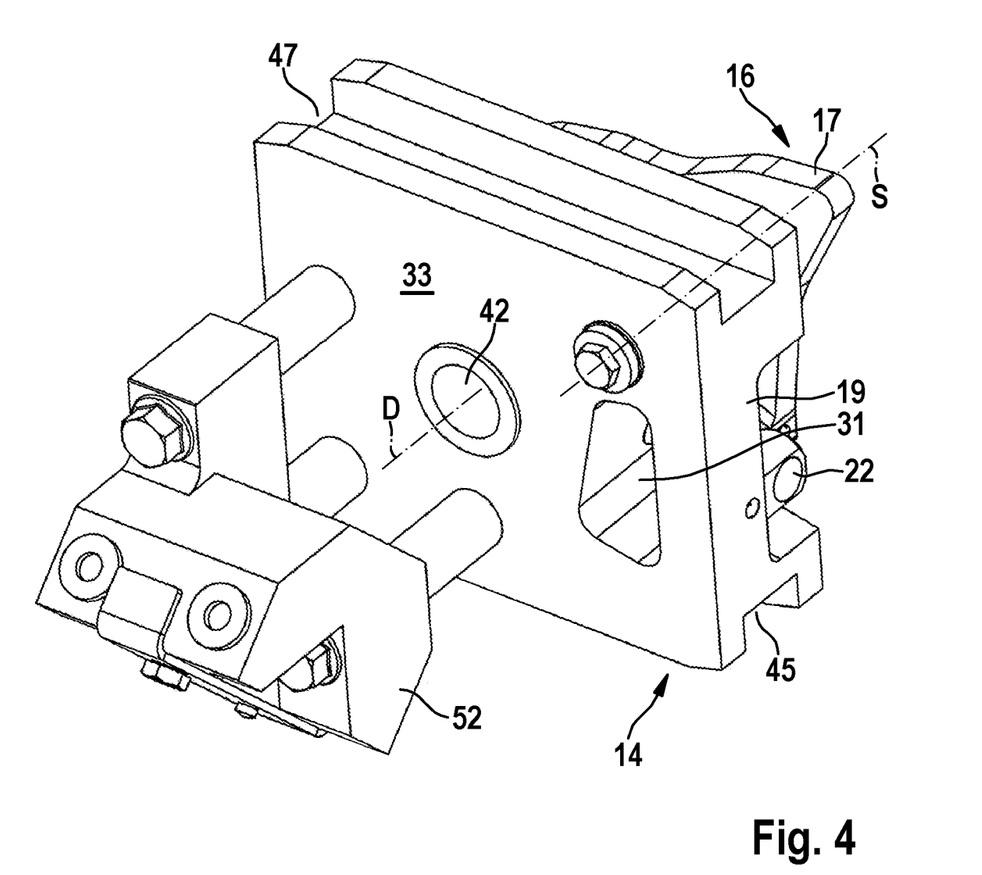
FIG. 4 shows a main body of the receptacle body of the holding apparatus with a latching lever from behind.

The principle of operation of the latching device 16 is explained in greater detail with reference to FIG. 1. The transport saddles 12 are driven in a revolving manner by means of the transport chain 43. The first transport saddle 12 in the direction of transport T is oriented with its main axis vertical. During transport, or during the movement of the transport chain 43 further in the direction of transport T, the latching lever 17 strikes the roller 48 with its actuating lug 38. The latching lever 17 (in the embodiment according to FIG. 1) is thereby pivoted counter-clockwise about the pivot axis S and thus pivoted out of engagement with the latching bolt 18 of the fastening body 15 into the release position. The fastening body 15 and thus the transport saddle 12 are freely rotatable in this phase. During further transport, or during the movement of the transport chain 43 further in the direction of transport T, the rotating body 25 of the fastening body 15 strikes the arm 50 of the angle element 49 with one of the recesses 35 and an operative connection is produced, which has the result that the freely rotatable rotating body 25, during further movement in the direction of transport T, is rotated against the stationary arm 50 (in the embodiment according to FIG. 1) clockwise about the axis of rotation D.

During the free rotation, a latching bolt 18 runs on the inner side I of the latching lever 17. The latching lever 17 is thereby, or as a result thereof, further held in the release position. As soon as the latching bolt 18 comes into the region of the recess 36 of the latching lever 17, after rotation of the rotating body 25 through approximately 90°, the latching lever 17 snaps back into the locking position as a result of the force of attraction of the first and second magnetic elements 22, 23. This movement of the latching lever 17 is assisted by the repelling action of the second and third magnetic elements 23, 27. The transport saddle 12 is thus oriented with its main axis horizontal.

The invention claimed is:

1. A transport apparatus for transporting eviscerated poultry bodies or parts thereof in a direction of transport T along a transport path, along which different processing stations can be arranged, comprising:
   a transport unit driven in a continuously revolving manner; and
   at least one transport saddle fastened to the transport unit for holding and positioning the poultry bodies or parts thereof during transport;
   wherein a holding apparatus is provided for fastening the transport saddle to the transport unit, which holding apparatus consists of;
      a receptacle body associated with the transport unit;
      a fastening body associated with the transport saddle, which fastening body is releasably connected to the receptacle body and is mounted in the receptacle body so as to be rotatable about an axis of rotation D;
      a latching device by means of which the fastening body and thus the transport saddle can be locked in at least two different latching positions, wherein the latching device comprises;
      a latching lever; and
      at least two latching bolts;
      wherein the latching lever is arranged on a main body of the receptacle body so as to be pivotable about a pivot axis S, which is oriented parallel to the axis of rotation D, and is movable from a locking position, in which the latching lever is in engagement with a latching bolt associated with the fastening body, into a release position, in which the latching lever is out of engagement with a latching bolt of the fastening body, and movable back into the locking position;
   wherein the transport apparatus further comprises a first actuating member for actuating the latching lever at least from the locking position into the release position and a second actuating member for rotating the fastening body in the release position of the latching lever;
   wherein the latching device further comprises at least two magnetic elements, wherein a first magnetic element is associated with the receptacle body and a second magnetic element is associated with the latching lever, such that unlike poles of the first magnetic element and of the second magnetic element are located opposite one another so as to attract one another and pull the latching lever into the locking position.

2. The transport apparatus according to claim 1, wherein the latching device further comprises a third magnetic element which is associated with the receptacle body and is positioned on a side of the latching lever opposite the first magnetic element, such that like poles of the second magnetic element and of the third magnetic element are located opposite one another so as to repel one another and push the latching lever into the locking position.

3. The transport apparatus according to claim 1, wherein the main body of the receptacle body has a depression at a trailing end in the direction of transport T on a side facing the fastening body, into which depression the latching lever with a protrusion dips at least in part, wherein the first magnetic element is positioned in the depression of the main body in a region of a rear wall and the second magnetic element is positioned in the protrusion of the latching lever.

4. The transport apparatus according to claim 3, wherein the third magnetic element is positioned in the depression of the main body in the region of a side wall, such that the latching lever is arranged with its protrusion, in which the second magnetic element is located, between the first and the third magnetic element in the manner of a sandwich.

5. The transport apparatus according to claim 3, wherein the main body has an opening in the region of the depression, the main orientation of which opening is oriented parallel to the pivot axis S and the axis of rotation D, such that the protrusion of the latching lever dips with its free end at least in part into this opening, such that a side wall of the opening, in addition to the latching bolt, is configured as an abutment for the latching lever in its locking position.

6. The transport apparatus according to claim 1, wherein there is associated with the fastening body a rotating body in the form of a Maltese cross, which has on the one hand four recesses arranged offset relative to one another by 90° in a region of a circumference for the engagement of the second actuating member for rotating the fastening body, and on the other hand, on a side facing the receptacle body, at least four latching bolts arranged offset relative to one another by 90°, which latching bolts can be brought into operative connection with the latching lever.

7. The transport apparatus according to claim 6, wherein the latching lever has on an inner side facing the axis of rotation D a recess for receiving a latching bolt.

8. The transport apparatus according to claim 1, wherein the transport unit further comprises a transport chain, and at least one guide rail is arranged along the transport chain at least in some regions, on which guide rail the receptacle body of the holding apparatus is guided with a groove formed in the main body.

9. The transport apparatus according to claim 8, wherein the at least one guide rail comprises two guide rails arranged spaced apart from one another arranged along the transport chain at least in some regions, between which guide rails the main body is guided with corresponding grooves, wherein the first actuating member for actuating the latching lever is arranged on one guide rail and the second actuating member for rotating the fastening body is arranged on the other guide rail.

10. The transport apparatus according to claim 1, wherein the second actuating member for rotating the fastening body is arranged behind the first actuating member for actuating the latching lever in the direction of transport T of the transport unit.

11. The transport apparatus according to claim 1, wherein the latching lever projects with an actuating lug beyond the main body of the receptacle body, such that the first actuating member for actuating the latching lever enters into operative connection with the actuating lug of the latching lever as the transport saddle passes.

12. The transport apparatus according to claim 1, wherein at least some of the magnetic elements are in the form of bar magnets, wherein the bar magnets are oriented with their longitudinal axis in the direction of transport T.

13. The transport apparatus according to claim 12, wherein at least some of the bar magnets are arranged in blind holes, wherein the open sides of the blind holes are closed by means of a cover, such that the bar magnets inside the blind holes are completely shielded relative to the surroundings.

* * * * *